Patented June 19, 1951

2,557,647

UNITED STATES PATENT OFFICE 2,557,647

EMULSION FLUID FOR DRILLING WELLS

John I. Gates, Pasadena, and Wilson M. Wallis, Long Beach, Calif., assignors to Shell Development Company, San Francisco, Calif., a corporation of Delaware No Drawing. Application July 27, 1948, Serial No. 40,991

11 Claims. (Cl. 252—8.5)

This invention relates to the drilling of oil and gas wells and pertains more particularly to the use and composition of an improved oil base drilling fluid of the water-in-oil emulsion type.

Drilling fluids or muds are generally used when drilling wells by the rotary method. These muds are usually pumped down through the drill stem of the rotary rig and around the drill bit, returning to the surface through the annular passage between the drill stem and the well casing. Drilling fluids, circulated in this manner during the operation of drilling, fulfill the various functions of carrying cuttings to the surface, cooling and lubricating the drilling tools, sealing the walls of the borehole by forming a mud-sheath thereon, and supplying a static head to overcome pressures encountered during the drilling operations that tend to blow the fluid from the borehole.

Formerly, most of the drilling fluids were either of the water-base or oil-base type depending on whether they employed water or oil (or a non-aqueous liquid) as a suspending medium or component. Of more recent development is a class of drilling fluids known as drilling emulsions wherein water is emulsified with oil to form the suspending medium.

A prime requisite of a satisfactory drilling emulsion or fluid is that it possesses a good gel structure, preferably a substantially thixotropic gel structure. In the event that the circulation of drilling fluid in the borehole suddenly fails, or is stopped, during drilling operations, it is a function of the drilling fluid to support the particles of weighting materials and rock cuttings at their respective positions in the column of drilling fluid to prevent their settling to the bottom of the borehole. A drilling fluid with a thixotropic gel structure can successfully support the various materials carried thereby for considerable periods of time, thus preventing their settling around the drill bit and drill string at the bottom of the borehole which would result in the bit becoming immovably positioned therein.

Another requisite of a satisfactory drilling emulsion or fluid is that it possesses good plastering or sheath-forming characteristics. That is, it must form on the walls of the borehole a mud-sheath effectively preventing any appreciable fluid loss to the formation. Any substantial loss of fluid to the formation is undesirable at any time during the drilling, being especially dangerous and objectionable when drilling through heaving formations such as shale, or when drilling into the producing zone, which may be contaminated and plugged by said fluid.

A further desirable characteristic of a drilling emulsion is that it remains substantially stable after being contaminated with a salt solution. With many drilling emulsions there is a tendency of the oil and water to stratify in the presence of even moderately high concentrations of electrolytes, such, for example, as brines entering the borehole from the formation and becoming admixed with the drilling emulsion. There is also a tendency for the viscosity of drilling emulsions to increase when contaminated with a salt solution thus imposing an additional load on the mud pumps used in circulating the drilling emulsion into and out of the borehole.

During the drilling of a well several hundred or thousand barrels of a drilling emulsion may be used. Therefore, it is economically advantageous to employ a low cost drilling emulsion. Since the emulsifying agent is often one of the most expensive ingredients in a drilling emulsion, it is desirable to use one that is inexpensive and/or one which forms a satisfactory emulsion when only small quantities of the emulsifier are used.

The term oil and water emulsions, as used here, includes two general types of emulsions: oil-in-water and water-in-oil. The present invention is mainly concerned with water-in-oil emulsions where the water is present in the disperse phase while the oil forms the continuous phase.

It is therefore an object of this invention to provide an improved water-in-oil drilling emulsion possessing a substantially thixotropic gel structure, thereby being adapted to support weighting materials and drill cuttings carried by said emulsion.

It is also an object of the present invention to provide a relatively inexpensive emulsion requiring only small quantities of an emulsifying agent incorporated therein.

Another object of this invention is to provide a drilling emulsion which is neither impaired by high temperatures nor affected by brine contamination to the extent of ordinary drilling fluids.

These and other objects of this invention will be understood from the following detailed description of the invention.

The present invention can be practiced by adding an oil soluble polyvalent (preferably di- or trivalent) metal salt or soap of a natural wood resin residue, preferably wood rosin residue, to a mixture of water and oil as an emulsifying and stabilizing agent in forming drilling emulsions of the water-in-oil type. The use of such an emulsifying agent yields an emulsion that forms a thin, impervious mudsheath on the borehole walls and thus prevents water, being the internal phase, from contaminating the producing formation. An outstanding advantage is that the above emulsions possess a substantially thixotropic gel structure and exhibit little tendency to settle out or increase in viscosity when contaminated with salt water. Water-in-oil drilling emulsions incorporating soaps as emulsifying and stabilizing agents according to the present invention can also be used successfully in deep wells or in wells where high temperatures are encountered as these emulsions remain relatively stable at high temperatures.

The oil soluble polyvalent metal soap of a natural wood resin residue is conveniently made simply by mixing the wood resin residue with an excess of an aqueous solution of a polyvalent hydroxide, e. g. calcium or magnesium hydroxide, and stirring the mixture with or without heating, as desired, until the reaction is complete.

The resin, which may thus be saponified and which is characterized by the term "natural wood resin residue" herein and in the appended claims, may be the resinous material obtained as a by-product in the selective refining of crude wood resin. Preferably, the source of the natural wood resin residue is pine wood from which a dark-colored resinous material, known as B wood rosin, is obtained as a by-product in the selective refining of the crude wood rosin. Another natural wood resin residue having somewhat similar characteristics and also exhibiting improved emulsion forming properties, may be obtained by, first, extracting the pine wood with a coal tar hydrocarbon such as benzol or toluol or with a solvent such as furfural, secondly, freeing the extract of its more volatile constituents and, thirdly, extracting the rosin from the residue of the first extraction with a substantially non-aromatic petroleum hydrocarbon such as, for example, gasoline to yield a resinous residue which may be saponified and employed according to the present invention.

The natural wood resin residues obtained from pine wood are characterized by being dark in color, having an acid number in the range from about 80 to about 130, a drop melting point in the range of about 75° C. to about 125° C., and comprising from about 35 per cent to substantially 100 per cent gasoline insolubles.

In general, the polyvalent metal soaps of the above-described natural wood resin residues are oil dispersible or oil soluble. However, if they are not sufficiently soluble to be employed according to the present invention, a small proportion (about 1 per cent by weight of the emulsifying agent) of any well known solubilizer may be used such, for example, as alkyl phenols (ditertiary-butyl phenol), higher alcohols (acetyl, stearyl, or abietyl alcohols), or the like. Normally, only small amounts of these polyvalent soaps of natural wood resin residues need be used as an emulsifier to obtain a satisfactory water-in-oil emulsion according to the present invention. The amount of emulsifier used may vary from about 0.4 per cent to about 5.0 per cent by weight depending on the polyvalent resin residue soap used. In general, excellent emulsions may be obtained with most of these soaps when about 1 per cent (by weight) of the emulsifier is used.

A preferred method of carrying out the objects of the present invention comprises the addition of an alkali salt of a natural wood rosin residue and a water soluble salt of a polyvalent (preferably di- or trivalent) metal to a water-in-oil drilling emulsion to form in the emulsion an oil dispersible or oil soluble polyvalent (preferably di- or trivalent) metal salt or soap of a natural wood rosin residue and a water soluble, and oil insoluble, inorganic salt. The term alkali salts is meant to include alkali metal and ammonium salts. The salts of the natural wood rosin residues used are prepared from natural resins, at least 35 per cent of which are insoluble in gasoline. A preferred resin is B wood rosin which comprises 35 to 75 per cent and generally 60 per cent, gasoline insolubles. It may be conveniently saponified with an excess of an aqueous alkali-metal hydroxide, e. g., sodium or potassium hydroxide. Any of the water soluble salts of di- or trivalent metals may be employed such as the sulfates, bromides, chlorides, etc., of magnesium, calcium, aluminum, iron, etc. It must be particularly noted that magnesium soaps are greatly preferred to others because the oil soluble salts of this metal are more efficient emulsion promoters than other oil soluble soaps.

Thus, for example, the addition of a mixture of the sodium soap of B wood rosin and magnesium sulfate $MgSO_4, 7H_2O$ will form, in the oil phase of the emulsion, an oil soluble magnesium soap of B wood rosin, which acts as an emulsifying and stabilizing agent for the emulsion, and at the same time will form a water soluble and oil insoluble inorganic salt sodium sulfate, which dissolves in the water phase of the emulsion and converts the water phase to an electrolytic solution. Since the water phase of the emulsion is an electrolytic solution, it is possible for electrical logs to be run in wells drilled with these emulsions.

Drilling emulsions may comprise several components which commonly include a suspending component or medium, a suspended component, a plastering agent and an emulsifying and/or stabilizing agent. The suspending medium in the case of an emulsion of the present invention is formed of oil and water, said water preferably constituting from 10% to 40% by volume of the mixture. The continuous or oil phase of the present emulsion may be in the form of any suitable non-aqueous liquid such as a mineral oil, Diesel oil, fuel oil, crude oil, kerosene, stove oil and the like. A plastering agent such as a blown asphalt is commonly incorporated in the emulsion to seal the porous walls of the borehole by forming a sheath of mud thereon. The blown asphalt is preferably added to the oil phase prior to emulsification, in relatively small quantities such as from 5 to 15% on the weight of the oil phase. A suspended component in the form of a weighting material is generally included in order to improve plastering to some extent and to add weight to the drilling emulsion to overcome any formation pressures encountered during drilling operations. Weighting materials commonly used are clay, crushed oyster shells, barites, hematite, magnetite, etc. However, for the purposes of the present invention the preferred weighting materials are those finely ground or powdered weighting materials having a greater tendency to be wetted by oil than by water. The weighting material may constitute a substantial weight of the drilling emulsion, e. g. in the range of 20 to 60 per cent.

Drilling emulsions prepared according to the present invention were found to have excellent gel structures which were substantially thixotropic. It has also been found that emulsions incorporating extremely small quantities of the resin residue soaps exhibited greatly improved characteristics over drilling emulsions incorporating much larger quantities of some of the best emulsifiers known to date for drilling emulsions.

For example, two weighted (72 lbs. per cubic foot) water-in-oil drilling emulsions were prepared; Emulsion No. 1 contained 1 per cent (by weight) of the magnesium soap of B wood rosin as an emulsifier and Emulsion No. 2 contained 2 per cent (by weight) of magnesium tallate as an emulsifier which is one of the best emulsifiers used in drilling emulsions. The two emulsions were subjected to numerous tests with the results as shown in Table 1:

| Viscosity, Stormer, 600 R.P.M. | | Gel (Stormer) | | Settling | | | Remarks | Filter Loss at 275° F. and 500 p.s.i. |
|---|---|---|---|---|---|---|---|---|
| Grams | Temp. | Initial | 10 min. | Temp. | Top | Bottom | | cc./sq. cm. Hour |
| EMULSION NO. 1 | | | | | | | | |
| 337 | °C. 25 | Gms. 6 | Gms. 24 | °C. 95 | Per Cent 18 | 0 | Firm Gel | .13 |
| 250 | 45 | | | 150 | 48 | 0 | do | |
| 202 | 65 | | | | | | | |
| 115 | 85 | | | | | | | |
| 100 | 90 | | | | | | | |
| EMULSION NO. 2 | | | | | | | | |
| 292 | 25 | 6 | 7 | 95 | 50 | 0 | Soft Gel | .14 |
| 192 | 45 | | | 150 | 50 | 0 | do | |
| 125 | 65 | | | | | | | |
| 88 | 85 | | | | | | | |
| 70 | 90 | | | | | | | |

The viscosity and gel values in the above table were obtained with a Stormer viscosimeter.

It may be seen from the above table that the viscosity of the rosin soap emulsion was more stable than that of the magnesium tallate emulsion on increasing the temperature. On standing, the initial gel and 10 minute gel in Emulsion No. 2 was practically the same and rather low, while the 10 minute gel of Emulsion No. 1 (rosin soap) was substantially stronger. Considerable improvement in the top settling characteristic of Emulsion No. 1 was noted at 95° C. while both emulsions were about the same at 150° C. Top settling may be defined as the formation of a free oil layer on the top of a drilling emulsion upon standing at elevated temperatures. Neither emulsion exhibited any bottom settling of materials carried by the mud and the plastering properties of both emulsions at elevated temperatures was excellent. It is important to note that the Emulsion No. 1 containing the rosin soap emulsifier according to the present invention exhibited improved characteristics over Emulsion No. 2 while only incorporating one-half the amount (by weight) of emulsifier used in Emulsion No. 2.

The effect of salt water contamination on the above emulsions was tested by adding 20 per cent by volume of a 5 per cent salt solution to each of the emulsions. The emulsions were then subjected to a series of tests with the result as shown in Table No. 2:

| Viscosity, Stormer, 600 R.P.M. | | Initial | 10 min. | Settling | | | Remarks | Filter Loss at 275° F. and 500 p.s.i. |
|---|---|---|---|---|---|---|---|---|
| Grams | Temp. | | | Temp. | Top | Bottom | | cc./sq. cm. Hour |
| EMULSION NO. 1 | | | | | | | | |
| 405 | °C. 26 | Gms. 8 | Gms. 15 | °C. 95 | Per Cent 17 | 0 | Firm Gel | .09 |
| | | | | 150 | 27 | 0 | do | |
| EMULSION NO. 2 | | | | | | | | |
| 370 | 26 | 7 | 9 | 95 | 67 | 0 | Soft Gel | .14 |
| | | | | 150 | 60 | | do | |

The viscosities of both emulsions were raised about the same value upon the addition of salt water. The outstanding difference appears in the settling tests. Emulsion No. 2 settled badly while Emulsion No. 1 (rosin soap emulsifier) exhibited little top settling and in fact showed slightly improved settling properties over the same emulsion before it was contaminated, especially at 150° C. Emulsion No. 1 also showed improved plastering qualities as indicated by the lower filter loss.

Drilling emulsions incorporating the rosin soap emulsifier in accordance with the present invention were found to remain smooth when contaminated with 20 per cent by volume of a 50 per cent Mojave clay slurry to ascertain the effect of clay or shale contamination. On the other hand, drilling emulsions containing magnesium tallate aas an emulsifier become grainy when contaminated in a like manner.

Another important function fulfilled by a rosin soap emulsifier of the present invention is its action as a surface-active agent on any weighting materials incorporated in drilling fluids. Normally, when a weighting agent, such as water-wet limestone, is added to the oil phase of the drilling mud, it will remain wet and the mud will be grainy. However, when a rosin soap emulsifier of the present invention is added the water is displaced from the limestone, which is then dispersed evenly throughout the mud. Other surface-active agents are known to make weighting agents oil dispersible, but in doing so they adversely affect the mud gel structure so that the weighting agents settle out rapidly. An important property exhibited by the rosin soap emulsifiers of the present invention is that of making weighting materials more oil-dispersible without adversely affecting the mud gel structure.

We claim as our invention:

1. A drilling fluid for wells, comprising a predominant quantity of oil and water emulsified therein, a finely divided solid weighting material dispersed in said emulsion, and a relatively small quantity of an emulsifying agent capable of stabilizing the emulsion, said emulsifying agent comprising an oil dispersable polyvalent metal soap of a "natural wood resin residue."

2. A drilling fluid for wells, comprising a predominant quantity of oil and water emulsified therein, a finely divided solid weighting material dispersed in said emulsion, and a relatively small quantity of an emulsifying agent capable of stabilizing the emulsion, said emulsifying agent comprising the reaction product of a polyvalent basic reacting agent with a "natural wood resin residue."

3. A drilling fluid for wells, comprising a predominant quantity of oil and water emulsified therein, a finely divided solid weighting material dispersed in said emulsion, an oil dispersible polyvalent metal salt of a "wood rosin residue," sufficient in quantity to emulsify and stabilize said emulsion and a water soluble inorganic salt forming an electrolyte with the water.

4. A drilling fluid for wells, comprising a predominant quantity of oil and water emulsified therein, a finely divided solid weighting material dispersed in said emulsion, and the reaction products of an alkali metal salt of a "wood rosin residue" and a water soluble salt of a divalent metal, as the emulsifying agent.

5. A drilling fluid for wells, comprising a water-in-oil emulsion a finely divided weighting material dispersed in said emulsion, and an oil dispersible divalent metal soap of B wood rosin, as an emulsifying agent.

6. A drilling fluid for wells, comprising a water-in-oil emulsion, a finely divided weighting material dispersed in said emulsion, and the magnesium soap of B wood rosin as an emulsifying agent.

7. A drilling fluid for wells, comprising a water-in-oil emulsion wherein the water phase constitutes in the range of from 10 to 40 per cent by volume of the emulsion, a finely divided weighting material dispersed in said emulsion, and a small quantity of emulsifying agent capable of imparting a substantial thixotropic gel structure to said emulsion, said agent constituting in the range of from 0.4 to 5.0 per cent by weight of the total emulsion, said emulsifying agent consisting of an oil dispersible divalent metal soap of "wood rosin residue."

8. A drilling fluid for wells, comprising a predominant quantity of oil and water emulsified therein, a finely divided solid weighting material dispersed in said emulsion sufficient in amount to render said emulsion heavier than water, and a relatively small quantity of an emulsifying agent capable of stabilizing the emulsion, said emulsifying agent comprising an oil dispersible polyvalent metal soap of a "natural wood resin residue."

9. A drilling fluid for wells, comprising a predominent quantity of oil having water emulsified therein, a finely divided solid weighting material dispersed in said emulsion, and from 0.4 to 5 per cent of an emulsifying agent consisting of the soap of a polyvalent basic reacting agent with a "natural wood resin residue."

10. A drilling fluid for wells, comprising a predominant quantity of oil having water emulsified therein, a finely divided solid material dispersed in said emulsion, and from 0.4 to 5 per cent of an emulsifier consisting of a polyvalent metal soap of "natural wood resin residue" having an acid number from 80 to 130 and a melting point from 75 to 125° C.

11. A drilling fluid for wells, comprising a predominant quantity of oil and water emulsified therein, a finely divided solid weighting material dispersed in said emulsion, and the reaction product formed in situ by the reaction of a monovalent soap of a "natural wood resin residue" and a water-soluble salt of a polyvalent metal, said reaction products being sufficient in quantity to emulsify and stabilize said emulsion.

JOHN I. GATES.
WILSON M. WALLIS.

REFERENCES CITED

The following references are of record in the file of this patent:

UNITED STATES PATENTS

| Number | Name | Date |
|---|---|---|
| 2,099,825 | Rolshausen | Nov. 23, 1937 |
| 2,151,029 | Henst | Mar. 21, 1939 |
| 2,155,029 | Maters et al. | Apr. 18, 1939 |
| 2,350,154 | Dawson et al. | May 30, 1944 |
| 2,360,992 | Weiss | Oct. 24, 1944 |
| 2,380,156 | Dobson et al. | July 10, 1945 |
| 2,430,039 | Anderson | Nov. 4, 1947 |
| 2,476,845 | Dawson | July 19, 1949 |